2 Sheets. Sheet 1.
J. Moore.
Elevator.
No. 3,200. Reissued Nov. 17, 1868.
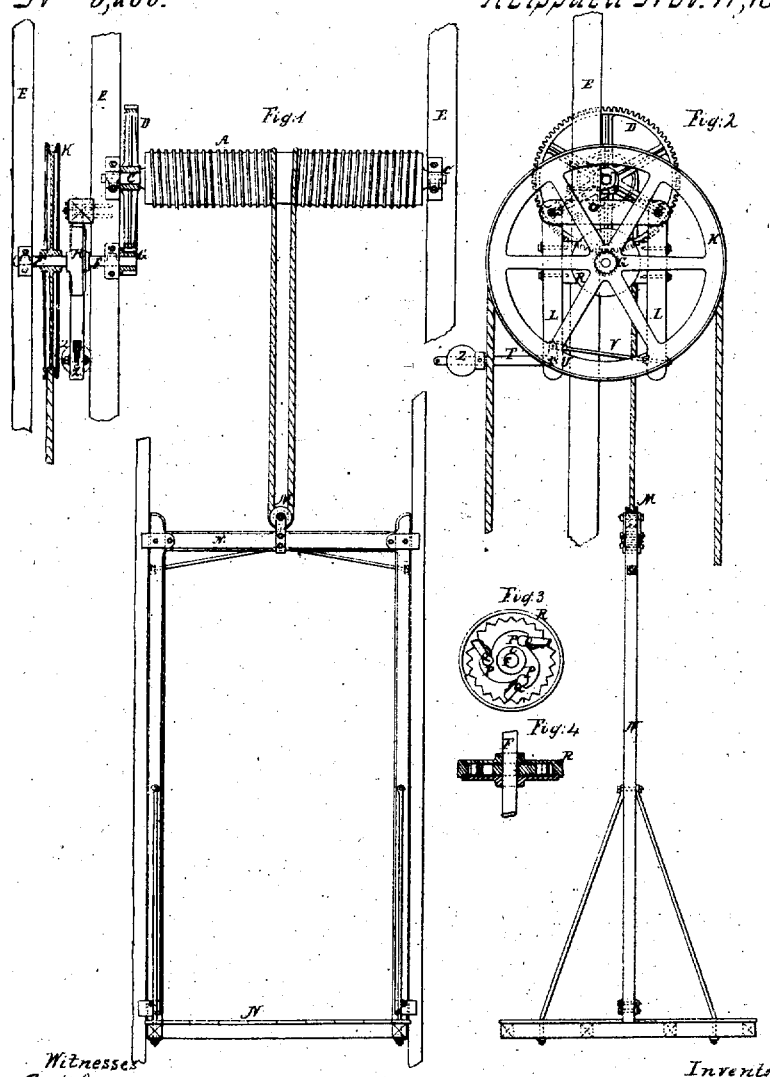
Witnesses
Geo. H. Strong
Geo. A. Wadsworth
Inventor
Joseph Moore 2 Sheets, Sheet 2.
J. Moore,
Elevator.
No. 3,200. Reissued Nov. 17, 1868.
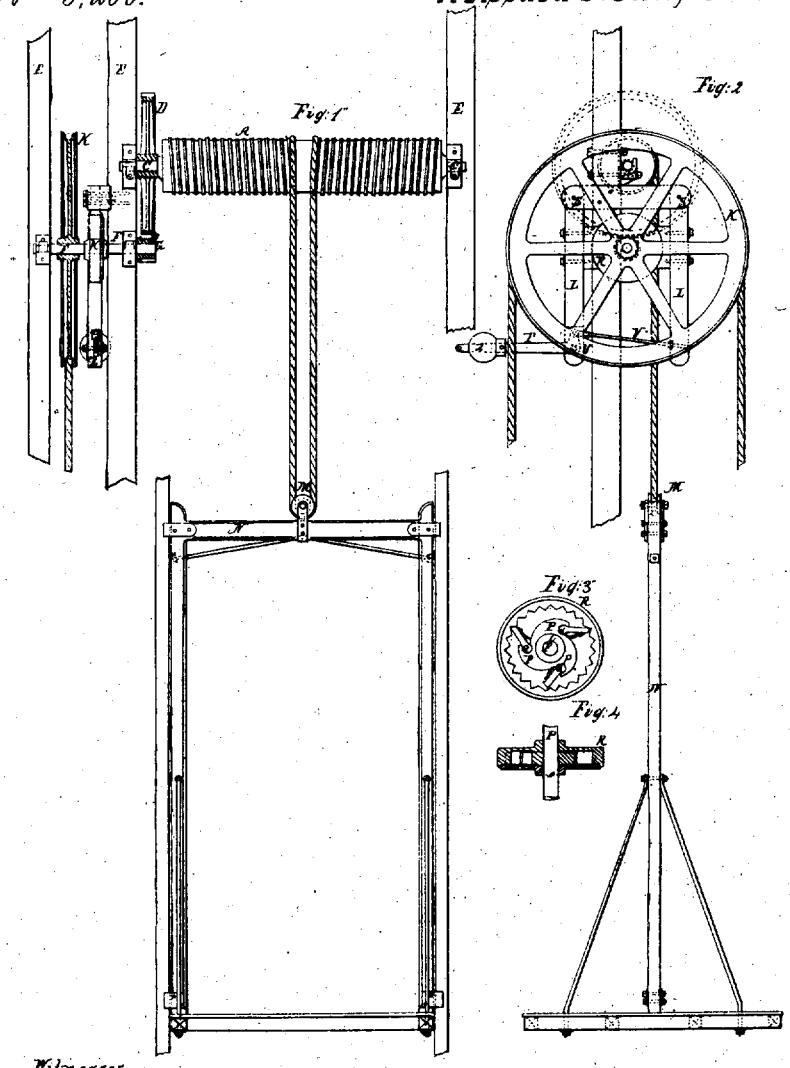
Witnesses
Aspen Rice
H. D. Smith
Inventor
Joseph Moore United States Patent Office.

JOSEPH MOORE, OF SAN FRANCISCO, CALIFORNIA.

*Letters Patent No.* 64,554, *dated May* 7, 1867; *reissue No.* 3,200, *dated November* 17, 1868.

IMPROVED FRICTION-PAWL.

The Schedule referred to in these Letters Patent and making part of the same.

*To all whom it may concern:*

Be it known that I, JOSEPH MOORE, of the city and county of San Francisco, and State of California, have invented a certain Improvement in Hoisting-Apparatus; and I do hereby declare the following description and accompanying drawings are sufficient to enable any person skilled in the art to which it most nearly belongs, to make and use my said invention without any further invention or experiment.

In the drawings, which form a part of this specification—

Figure 1 represents a side elevation of a hoisting-apparatus with my improvement, with section of gears and wheel.

Figure 2, an end elevation.

Figure 3, a side view of pawls and ratchet-pulley or case.

Figure 4, a sectional view of the same.

Similar letters of reference, in the different figures, indicate the same parts.

A is a hoisting-drum, which extends across the hatchway.

C C are bearings to the same.

D is a gear, fastened to the drum.

E E E are posts, supporting the drum-bearings and others.

F is a small shaft, upon which are fastened the pinion G, rope-wheel K, and friction-clutch R.

Upon the drum A, spiral grooves are made, running from right to left on one side, and from left to right on the other, of the centre, to which drum there is attached a chain or rope, fastened, at both ends, to the drum, with a pulley, M, in line below the middle of it, to which is hung the cage N, sliding in grooves in the usual manner.

The pawl-hub O is keyed fast to the shaft F, and has several recesses, P P P, to receive the inner ends of the pawls Q Q Q, while their outer ends catch in teeth on the inside of the rim of the friction-pulley R, which runs loose on the shaft F, and has, instead of arms, one side solid, and a round plate fitted to the other side, thus forming a case, within which the pawls work, and by which they are kept in place.

The round plate has a hub, which runs loose on one side of the pawl-hub O, while the pulley-hub runs loose on the other.

It will be seen that the pulley or case R can be revolved in the direction in which the pawls point, while the shaft F is kept stationary, but cannot be turned the reverse way, on account of the pawls catching the teeth of the rim, and preventing its revolving without revolving the shaft with it.

The friction or brake-pulley R is prevented from revolving by two brakes, hung upon the pins S S, and reaching beyond the friction-pulley far enough to allow a bent lever, T, hung upon a pin, U, to act upon the two brake-beams L L, through the rod V, by the weight Z.

The action of my machine is as follows:

A load is put upon the cage N, and, by means of an endless rope over the pulley K, the shaft F is made to revolve, giving motion, through the gear G, to D and A in the direction for hoisting, causing the chain or rope to wind on the drum from both ends towards the centre, and so calculated to the height as to meet in the middle when the cage is at the top. While the cage has been rising, the brake has held the friction-pulley firmly stationary, and allowed the shaft to turn the pawl-hub O in the direction in which the pawls are free, but, on removing the power from the endless rope, the machinery all starts backward, and the load downward. This movement is at once and effectually stopped by the action of the pawls, pulley, and brake.

To lower the cage, it is only necessary to relieve the pulley from the brake by raising the weight Z.

The weight Z is heavy enough to stop the heaviest load to be carried on the cage, and therefore the cage can be left at any point in its passage with perfect safety.

Having thus described my invention,

What I claim as new, and desire to secure by Letters Patent, is—

As an improvement in hoisting-apparatus, a pulley, which shall be, on the one hand, under the control of a brake, bearing upon its outer surface, and, on the other hand, connected with the shaft by the pawl and ratchet-device, or its equivalent, within the pulley, substantially in the manner and for the purposes set forth.

January 9, 1868.

JOSEPH MOORE.

Witnesses:

M. D. ARNOT,

JAMES BOLAND.